H. NEWBOLD.
PLACQUET FOR EYEGLASSES.
APPLICATION FILED JUNE 21, 1920.
1,380,005.
Patented May 31, 1921.
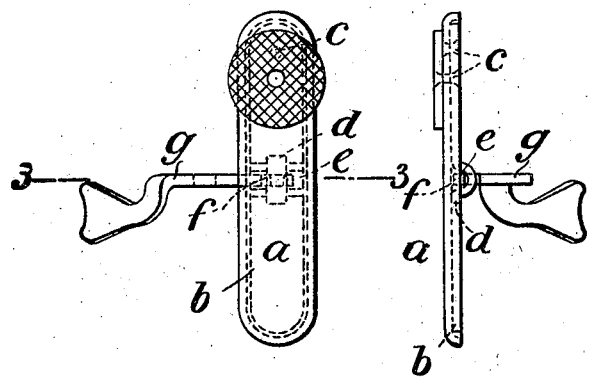

UNITED STATES PATENT OFFICE.

HARRY NEWBOLD, OF HERTS, ENGLAND.

PLACQUET FOR EYEGLASSES.

1,380,005.     Specification of Letters Patent.     Patented May 31, 1921.

Application filed June 21, 1920. Serial No. 390,642.

*To all whom it may concern:*

Be it known that I, HARRY NEWBOLD, a subject of the King of Great Britain, residing at St. Bernards, Cumberland Road, St. Albans, Herts, England, have invented new and useful Improvements in and in Connection with Placquets for Eyeglasses, of which the following is a specification.

My invention relates to improvements in placquets for eyeglasses of the kind which are detachable from the placquet-arms, finger-pieces or mounts.

According to my invention the placquet is secured to the finger piece or the like by means of a snap fastening which permits of the easy attachment and detachment of the said placquet when requiring to replace the same while at the same time providing a secure connection therefor.

In a suitable embodiment of the invention the rear face of the placquet is furnished with a spring plate which is made with a longitudinal slot flanked on either side by a transverse corrugation, and the fitting or placquet arm is made at that end to which the placquet is to be connected of a T-shape formation, the cross bar or head of the T being designed to be passed through the slot in the spring-plate and to be then turned through an angle of 90° so as to engage in the transverse corrugations, which form a bearing therefor, in which it is held by the resiliency of the spring plate.

To enable the invention to be fully understood, I will describe it by reference to the accompanying drawing, in which:—

Figure 1 is a face view of a placquet and a placquet-arm or finger-piece constructed according to the invention.

Fig. 2 is a view at right angles to Fig. 1.

Fig. 3 is a section in the line 3—3, Fig. 1.

Fig. 4 is a view similar to Fig. 3 but showing the placquet separated from the placquet-arm.

Fig. 5 is a rear view of the placquet, and

Fig. 6 is a section of the line 6—6, Fig. 5.

$a$ indicates the placquet, and $b$ is the spring plate which is attached at one end, as shown at $c$, to the rear face of the said placquet. $d$ is the longitudinal slot which is formed in the spring-plate $b$ and $e$ indicates the transverse corrugations which are formed on either side of the slot $d$ and constitute a transverse bearing for the reception of the cross-bar or head $f$ of the T-shaped extremity of the placquet-arm $g$.

As above described, to connect the placquet to the placquet-arm the spring plate $b$ is raised, as indicated in broken lines in Fig. 6, and the bar $f$ of the T-shaped extremity of the placquet-arm $g$ is passed through the slot $d$ in the spring plate $b$ after which the said placquet-arm, is turned through an angle of 90° so as to bring the said cross-bar $f$ into the transverse bearing formed by the corrugations $a$ in the spring plate, the elasticity of which latter is sufficient to retain the two members in connection, while at the same time permitting the said members to be detached with extreme facility when this is desired.

Claims.

1. In an eyeglass mount, a placquet arm having a permanently T-shaped extremity, and a placquet having a spring plate on its rear face, the said plate being slotted and recessed to form a bearing for the T-shaped extremity of the placquet-arm, substantially as herein described.

2. An eye glass mount, comprising a placquet arm having a T-shaped extremity, a placquet provided with a spring plate on its rear face, provided with a slot, a corrugation formed on either side of said slot forming a transverse bearing, said slot being of sufficient area to permit the insertion of the head of the T-shaped extremity of the placquet arm and its being turned thereafter to seat it in the transverse bearing formed by the corrugations.

3. An eye glass mount, comprising a placquet formed of a rigid plate, a spring plate attached to one end thereof, slotted and recessed to form a bearing, a placquet arm provided with a permanently T-shaped end adapted to fit in the bearing formed by said slot and recesses.

HARRY NEWBOLD.